April 14, 1942.  C. HERZOG  2,279,316

WELDING MACHINE

Filed April 1, 1941

INVENTOR.
CARL HERZOG
BY Charles McClair
ATTORNEY.

Patented Apr. 14, 1942

2,279,316

UNITED STATES PATENT OFFICE 2,279,316

WELDING MACHINE

Carl Herzog, Belleville, N. J., assignor to Radio Corporation of America, a corporation of Delaware Application April 1, 1941, Serial No. 386,280

3 Claims. (Cl. 219—4)

My invention relates to welding, particularly to means for welding wires to relatively inaccessible surfaces, such as means for joining a wire to the inside surface of a metal cylinder.

Welding is often the only feasible method of joining a wire to a metal surface but where the surface is inaccessible to welding electrodes difficulties are encountered. In the manufacture of such articles as radio tubes, most of the metal-to-metal connections are made by welding and in the manufacture of bases for the tubes, connections are often made to the inside surface of the metal cylinder of the base. In such cases the inconvenience and cost of passing a length of wire into a cylinder and introducing a welding electrode to press the wire to the cylinder and weld becomes objectionable.

An object of my invention is improved means for welding wire to inaccessible metal surfaces, particularly to means for joining wires to the inside surfaces of metal cylinders.

My novel welding means comprises means for feeding wire axially of the cylinder to which the wire is to be joined, deflecting the end of the wire on a curved insulating surface within the cylinder so that the end of the wire approaches end-on the surface to which it is to be welded. A source of electric power, such as a charged condenser, is connected between the wire and the cylinder. As the wire end touches the cylinder the two are joined by "percussion" welding.

The characteristic features of my invention are defined in the appended claims and one embodiment is described in the following specification and shown in the accompanying drawing in which:

Figure 1:
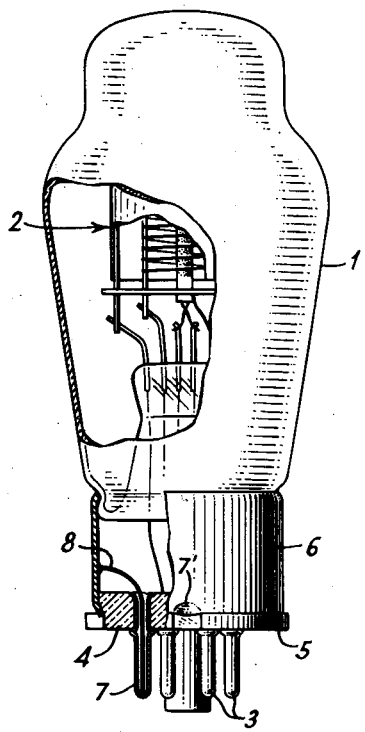
Figure 1 shows a radio tube with a base partly in section having a metal cylinder and a connected wire joined according to my invention.

To simplify description of my novel welding means, it is shown in connection with radio tube base manufacture although the invention is applicable to any article of commerce in which a wire must be joined by welding to a relatively inaccessible metal surface. The tube shown in Figure 1 is of conventional construction and comprises an envelope 1 containing electrode assembly 2 with lead wires through the stem of the envelope. The lead wires pass through and are connected at their lower ends, preferably by soldering, to the lower tip of tubular contact pins 3 stacked into the insulating base disc 4. Disc 4 is provided with a flange 5 and is secured in the end of the metal cylinder 6 preferably by crimping the lower rim of the cylinder into detents in the base as shown at 7'. For electrical reasons it is desirable to connect the metal cylinder 6 of the base to one of the contact pins 7. Pin 7 shown as the grounding pin may be connected through its socket connector to ground or to any desired source of potential to establish the potential of the metal cylinder 6 of the base. The connection between the grounding pin and metal cylinder is made by the short length of wire 8 soldered at one end into the lower end of the contact pin 7 and joined by welding, according to my invention, to the inside surface of the metal cylinder 6.

Figure 2:
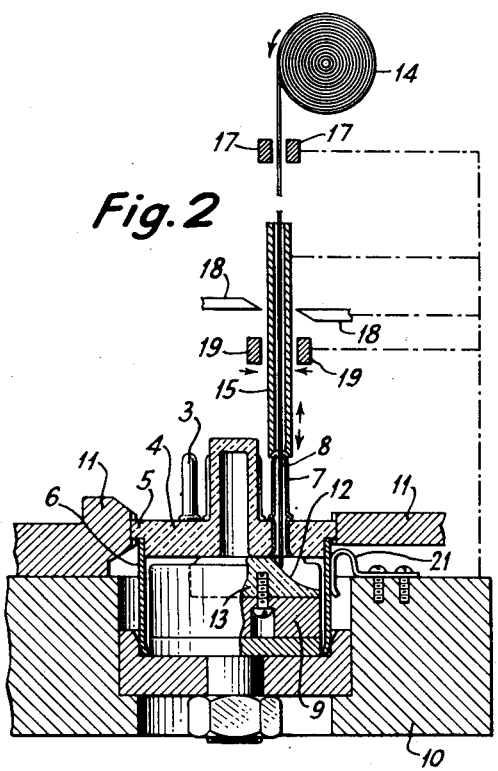
Figures 2 and 3 show in section one specific machine for joining a wire to the inside surface of a metal cylinder.
Figure 4:
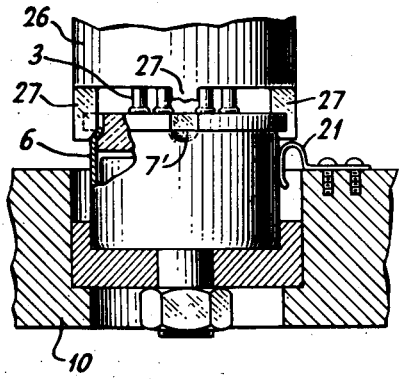
Figure 4 shows partly in section means for crimping the metal cylinder to the base portion of the radio tube base shown in Figure 1.
Figure 3:
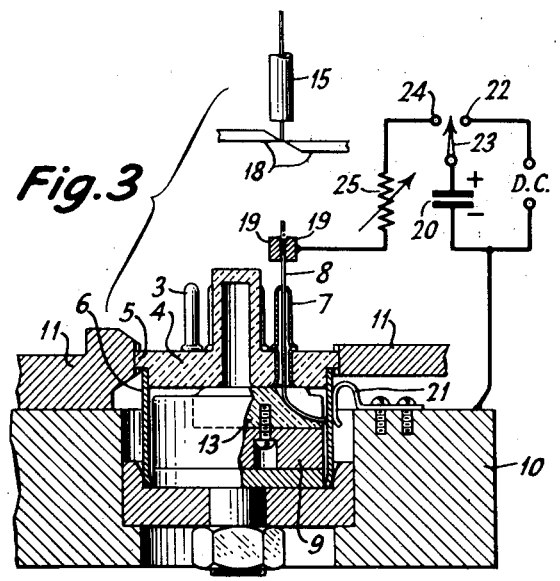

The radio tube base is fabricated as shown in Figure 2 by slipping the straight sided metal cylinder 6 over a round positioning die 9 bolted to the frame 10. The base disc 4 may then be placed in the upper end of the cylinder 6, the base disc being rotationally oriented by keys 11 which engage the detents in the flange 5 of the disc. The ground pin 7 may thus be positioned over the curved deflecting surface 12 of the insulating piece 13 secured to the upper surface of the round positioning die 9. A spool of wire or narrow metal ribbon 14 feeds wire downwardly and into the end of the ground pin 7. The wire preferably is passed through a reciprocating guide sleeve 15 with a cupped lower end for centering the hole in the sleeve over the hole in the pin. Clamps 17 or rollers may be employed by feeding the wire to the position shown in Figure 2 with the end of the wire at a point on the insulating deflecting surface 12. The guide tube is retracted, as shown in Figure 3, and cutting knives 18 move in to sever the wire while metal clamping jaws 19 grip and hold the severed piece of wire. The clamping jaws 19 are also reciprocated in a vertical direction to force downwardly the severed piece of wire 8 and to push its end along the deflecting surface 12 and into contact with the inner surface of the cylinder 6. Preferably, the curved surface 12 of the deflecting piece is so shaped as to bring the end of the wire substantially perpendicular to the cylinder wall. The clamping jaws 19 are electrically insulated from the rest of the machine and are connected to one terminal of a large welding condenser 20, the other terminal of the condenser being connected to the cylinder preferably through the frame of the machine. Resilient spring 21 may, if desired, be employed to insure good contact between the machine frame and the metal cylinder. A direct current source of power charges the condenser through contact 22 of the single-pole double-throw switch 23, the other contact 24 of the switch being connected preferably through an adjustable resistor 25 to the clamping jaws 19.

In operation, guide tube 15 moves down and onto the end of pin 7, clamps 17 then thread wire from spool 14 through grounding pin 7 as shown in Figure 2 and when the tube withdraws to its upper position, the wire is clamped by jaws 19 and is severed by cutting knives 18. During this feeding operation including the downward and upward movement of guide tube 15, condenser 20 is connected to its direct current charging source through contact 22. After the wire has been severed and is started on its downward travel by jaws 18, the charged condenser is connected through contact 24 to the jaws. Continued downward movement of the jaws deflect the wire along the curved surface 12 and into contact with the inner surface of the cylinder. At the instant of contact the condenser discharges through the end of the wire to the metal wall of the cylinder. Since the contact resistance between the wire end and wall is comparatively high, the wire end heats to its melting point and continued advance of the wire solidly welds the wire to the cylinder. Good results have been obtained in welding ground wire of nickel or nickel-plated iron to the base cylinder 6 of conventional radio receiving tubes where the cylinder is of nickel plated brass, where the wire is flat .010 inch by .020 inch, and where the condenser has a capacity of about 400 to 800 microfarads and is charged to a voltage of 300 volts.

The frame 10 may conveniently comprise a rotating table or dial with any desired number of positioning dies 9 spaced along its periphery. The cylinders and base discs described are loaded and indexed into the wire welding position and hence into a position for crimping the rim of the cylinder into the detents of the base disc. Such crimping means may comprise a tubular die 26 to clear the base pins and is provided with lugs 27 along its periphery, the lugs having inclined surfaces for bending the rim into the base detents. The finished base is then assembled with the radio tube by threading the lead wires through the base pins 3 and cementing the metal cylinders to the lower end of the envelope. All of the base pin-to-wire connections are then made by dipping the ends of the pins in solder.

My improved welder is applicable to many articles of manufacture where a wire must be joined to a relatively inaccessible metal surface, is easy to operate and is inexpensive to manufacture.

I claim:

1. A machine for joining a wire to the inside surface of a metal cylinder comprising means for holding the cylinder, means for moving the wire lengthwise into the end of the cylinder, a stationary piece with a deflecting surface of electrical insulating material in the cylinder for bending the end of the wire toward said inside surface, a condenser connected between said cylinder and wire, means for charging said condenser, the condenser being of such capacity that its electrical charge will weld the end of the wire to said surface upon contact.

2. A welding machine for joining a wire to one point on an extended surface of a metal member comprising a condenser, means for mechanically supporting said member, and an electrical connection between one terminal of the condenser and said member, means for feeding said wire lengthwise and approximately parallel to said surface, an insulating piece with a smooth deflecting surface in the path of the wire to bend the end of the wire toward said point on the surface of the metal member, and an electrical connection between said wire and the other terminal of said condenser.

3. A machine for making tube bases having a metal cylinder closed at one end with an insulating disc carrying hollow contact pins parallel to the axis of the cylinder, comprising a metal positioning die for receiving and holding said cylinder, means for feeding a wire lengthwise through one of said pins, an insulating piece on said die, said piece having a concave curved surface facing the inner end of said pin and the wall of said cylinder, and a source of electric power connected between said cylinder and said wire.

CARL HERZOG.